US012806458B2

(12) United States Patent
Felch et al.

(10) Patent No.: US 12,806,458 B2
(45) Date of Patent: Nov. 24, 2026

(54) HANDLE ASSEMBLY FOR A PORTABLE FIRE SUPPRESSION DEVICE

(71) Applicant: Tyco Fire Products LP, Cranston, RI (US)

(72) Inventors: Danielle Felch, Marinette, WI (US); Todd Robert Aerts, Marinette, WI (US)

(73) Assignee: Tyco Fire Products LP, Cranston, RI (US)

( * ) Notice: Subject to any disclaimer, the term of this patent is extended or adjusted under 35 U.S.C. 154(b) by 391 days.

(21) Appl. No.: 18/255,821

(22) PCT Filed: Jan. 28, 2022

(86) PCT No.: PCT/IB2022/050768
§ 371 (c)(1),
(2) Date: Jun. 2, 2023

(87) PCT Pub. No.: WO2022/162611
PCT Pub. Date: Aug. 4, 2022

(65) Prior Publication Data
US 2024/0009493 A1 Jan. 11, 2024

Related U.S. Application Data

(60) Provisional application No. 63/143,147, filed on Jan. 29, 2021.

(51) Int. Cl.
*A62C 13/66* (2006.01)
*A62C 13/70* (2006.01)
(Continued)

(52) U.S. Cl.
CPC .............. *A62C 13/66* (2013.01); *A62C 13/70* (2013.01); *A62C 13/76* (2013.01); *A62C 13/78* (2013.01)

(58) Field of Classification Search
CPC ......... A62C 13/66; A62C 13/70; A62C 13/76; A62C 13/78; B05B 15/63; F17C 2205/0165; B65D 83/182
(Continued)

(56) References Cited

U.S. PATENT DOCUMENTS 2,715,908 A 8/1955 Huthsing et al.
3,589,446 A * 6/1971 Bower .................. A62C 13/76 222/82

(Continued)

FOREIGN PATENT DOCUMENTS

CN 102614609 A 8/2012
KR 20190033236 A 3/2019

(Continued)

OTHER PUBLICATIONS

U.S. Patent and Trademark Office as International Searching Authority; International Search Report and Written Opinion; International Patent Application No. PCT/IB2022/050768; Apr. 7, 2022; 7 pages.

*Primary Examiner* — Kevin Edward Schwartz
(74) *Attorney, Agent, or Firm* — Foley & Lardner LLP

(57) ABSTRACT

A portable fire suppression device includes a cylinder, and a handle assembly. The cylinder is configured to store and discharge a fire suppressant agent. The handle assembly includes a handle and a resilient bumper. The handle includes a grasping portion for grasping with a user's hand and a connection portion. The connection portion defines a gap configured to receive and attach to a lug of the cylinder. The handle includes a free end located opposite the connection portion. The resilient bumper is positioned within an opening of the lug. The resilient bumper is positioned (Continued)

between the handle and the lug of the cylinder and is configured to absorb vibration and limit movement of the free end relative to the cylinder.

10 Claims, 10 Drawing Sheets

(51) Int. Cl.
*A62C 13/76* (2006.01)
*A62C 13/78* (2006.01)

(58) Field of Classification Search
USPC .................................. 169/88, 89; 222/465.1
See application file for complete search history.

(56) References Cited

U.S. PATENT DOCUMENTS

| | | | | | |
|---|---|---|---|---|---|
| 3,632,142 | A | | 1/1972 | Ichihara | |
| 3,662,836 | A | * | 5/1972 | Siimes | A62C 13/006 169/89 |
| 3,998,274 | A | * | 12/1976 | Liautaud | A62C 13/62 169/89 |
| 4,019,584 | A | * | 4/1977 | Allmendinger | A62C 13/64 169/89 |
| 4,176,794 | A | * | 12/1979 | Allenbaugh, Jr. | B05B 1/265 239/500 |
| 5,184,684 | A | * | 2/1993 | Kohlman | A62C 13/78 169/51 |
| 6,378,618 | B1 | * | 4/2002 | Yang | A62C 13/76 169/88 |
| 6,561,281 | B1 | * | 5/2003 | Arnold | A62C 31/22 169/46 |
| 10,828,519 | B2 | | 11/2020 | Kim et al. | |
| 2014/0238708 | A1 | * | 8/2014 | Baxendell | F16K 31/025 137/68.13 |
| 2015/0367155 | A1 | * | 12/2015 | Rousseau | A62C 13/70 169/75 |
| 2016/0167074 | A1 | * | 6/2016 | Beckerman | A47K 5/00 222/383.1 |
| 2018/0311520 | A1 | * | 11/2018 | Kim | A62C 13/64 |
| 2020/0215367 | A1 | * | 7/2020 | Joo | A62C 13/64 |
| 2021/0138282 | A1 | * | 5/2021 | Barrows | A62C 13/74 |

FOREIGN PATENT DOCUMENTS

| | | | | | |
|---|---|---|---|---|---|
| KR | 10-2020-0104173 | A | | 9/2020 | |
| WO | WO-2011123060 | A1 | * | 10/2011 | A62C 13/66 |

* cited by examiner

HANDLE ASSEMBLY FOR A PORTABLE FIRE SUPPRESSION DEVICE

CROSS-REFERENCE TO RELATED PATENT APPLICATION

This application claims the benefit of and priority to U.S. Application No. 63/143,147, filed Jan. 29, 2021, the entire disclosure of which is incorporated by reference herein.

BACKGROUND

The present disclosure relates to fire suppression devices. More specifically, the present disclosure relates to portable fire suppression devices, often called fire extinguishers.

SUMMARY

One implementation of the present disclosure is a portable fire suppression device, according to some embodiments. In some embodiments, the portable fire suppression device includes a cylinder, and a handle assembly. In some embodiments, the cylinder is configured to store and discharge a fire suppressant agent. In some embodiments, the cylinder includes an outlet for expelling the fire suppressant agent from the cylinder. In some embodiments, the handle assembly includes a handle and a resilient bumper. In some embodiments, the handle includes a grasping portion for grasping with a user's hand and a connection portion. In some embodiments, the connection portion defines a gap configured to receive and attach to a lug of the cylinder. In some embodiments, the handle includes a free end located opposite the connection portion. In some embodiments, the resilient bumper is positioned within an opening of the lug. In some embodiments, the resilient bumper is positioned between the handle and the lug of the cylinder and is configured to absorb vibration and limit movement of the free end relative to the cylinder.

In some embodiments, the portable fire suppression device further includes a pin configured to pivotally attach the handle to the lug of the cylinder. In some embodiments, the handle is configured to pivot relative to the resilient bumper and the cylinder a limited angular amount. In some embodiments, the limited angular amount is 15 degrees.

In some embodiments, the pin extends through multiple openings of the lug, a bore of the resilient bumper, and multiple openings of the connection portion of the handle. In some embodiments, the portable fire suppression device further includes an external cartridge coupled with the cylinder. In some embodiments, the external cartridge is configured to store a pressurized gas and fluidly couple with an inner volume of the cylinder to discharge the fire suppressant agent from the cylinder.

In some embodiments, the resilient bumper is a rubber bumper. In some embodiments, the rubber bumper includes a main portion, a protrusion, and an opening. In some embodiments, the main portion defines a cylinder facing end and an opposite end. In some embodiments, the protrusion extends downwards from the main portion at the cylinder facing end of the main portion. In some embodiments, the opening extends through the main portion. In some embodiments, the opening is configured to receive a pin that is configured to pivotally attach the handle to the lug of the cylinder. In some embodiments, the handle is configured to pivot relative to the resilient bumper and the cylinder a limited angular amount. In some embodiments, the main portion and the protrusion cooperatively define a surface at the cylinder facing end of the rubber bumper, the surface configured to abut the cylinder.

In some embodiments, the connection portion of the handle includes a curved rear surface within the gap. In some embodiments, the opposite end of the rubber bumper is proximate the curved rear surface. In some embodiments, a portion of the curved rear surface is configured to abut the opposite end of the rubber bumper at a particular angular position of the handle relative to the cylinder.

In some embodiments, the rubber bumper is received within the lug and the lug is received within the gap of the connection portion of the handle. In some embodiments, the resilient bumper is a spring.

Another implementation of the present disclosure is a handle assembly for a portable fire suppression device, according to some embodiments. In some embodiments, the handle assembly includes a handle, and a resilient bumper. In some embodiments, the handle includes a grasping portion for grasping with a user's hand and a connection portion. In some embodiments, the connection portion defines a gap configured to receive and attach to a lug of a cylinder of the portable fire suppression device. In some embodiments, the cylinder includes an outlet for expelling the fire suppressant agent from the cylinder. In some embodiments, the handle includes a free end located opposite the connection portion. In some embodiments, the resilient bumper is positioned within an opening of the lug. In some embodiments, the resilient bumper is positioned between the handle and the lug of the cylinder and is configured to absorb vibration and limit movement of the free end relative to the cylinder.

In some embodiments, the handle assembly further includes a pin configured to pivotally attach the handle to the lug of the cylinder. In some embodiments, the handle is configured to pivot relative to the resilient bumper and the cylinder a limited angular amount.

In some embodiments, the pin extends through openings of the lug, a bore of the rubber bumper, and openings of the connection portion of the handle. In some embodiments, the resilient bumper is a rubber bumper including a main portion, a protrusion, and an opening. In some embodiments, the main portion defines a cylinder facing end and an opposite end. In some embodiments, the protrusion extends downwards from the main portion at the cylinder facing end of the main portion. In some embodiments, the opening extends through the main portion. In some embodiments, the opening is configured to receive a pin that is configured to pivotally attach the handle to the lug of the cylinder. In some embodiments, the handle is configured to pivot relative to the resilient bumper and the cylinder a limited angular amount. In some embodiments, the main portion and the protrusion cooperatively define a surface at the cylinder facing end of the rubber bumper, the surface configured to abut the cylinder.

In some embodiments, the connection portion of the handle includes a curved rear surface within the gap. In some embodiments, the opposite end of the rubber bumper is proximate the curved rear surface. In some embodiments, a portion of the curved rear surface is configured to abut the opposite end of the rubber bumper at a particular angular position of the handle relative to the cylinder.

In some embodiments, the rubber bumper is received within the lug and the lug is received within the gap of the connection portion of the handle. In some embodiments, the resilient bumper is a spring.

Another implementation of the present disclosure is a portable fire suppression device, according to some embodiments. In some embodiments, the portable fire suppression device includes a cylinder, and a handle assembly. In some embodiments, the cylinder is configured to store and discharge a fire suppressant agent. In some embodiments, the cylinder includes an outlet for expelling the fire suppressant agent from the cylinder. In some embodiments, the handle assembly includes a handle, and a bumper. In some embodiments, the handle includes a grasping portion for grasping with a user's hand and a connection portion. In some embodiments, the connection portion defines a gap configured to receive and attach to a lug of the cylinder. In some embodiments, the handle includes a free end located opposite the connection portion. In some embodiments, the bumper is positioned on a protrusion of the handle that extends from a bottom portion of the gap. In some embodiments, the bumper is positioned between the handle and the lug of the cylinder and is configured to absorb vibration and limit movement of the free end relative to the cylinder.

In some embodiments, the protrusion includes a pair of openings. In some embodiments, the bumper includes a pair of walls, and a pair of protrusions. In some embodiments, the pair of walls are spaced apart and extend in a same direction from a main wall that defines a contact side facing the cylinder. In some embodiments, the pair of protrusions extend inwards from inner surfaces of the pair of walls. In some embodiments, the pair of protrusions are received within the pair of openings of the protrusion to couple the bumper with the handle.

In some embodiments, the bumper is a plastic insert having a molded rubber member disposed on the contact side facing the cylinder. In some embodiments, the molded rubber member defines a contact surface configured to engage the cylinder. In some embodiments, the bumper is an integrally formed rubber member and the main wall of the bumper defines the contact surface on the contact side of the main wall. In some embodiments, the contact surface is configured to engage the cylinder.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, a portable fire suppression device is shown, according to an exemplary embodiment. The portable fire suppression device (e.g., a fire extinguisher) includes a cylinder that stores and discharges a fire suppressant agent, and a handle assembly coupled with a side of the cylinder. The handle assembly can include a handle including a grasping portion and a connection portion. The connection portion can include walls that are configured to define a gap therebetween. The cylinder can include a lug that is sized to fit within the gap when the handle is assembled on the cylinder. A bumper is positioned between the lug and the connection portion of the handle to absorb vibration of the handle assembly when the portable fire suppression device is operated. The bumper may limit movement of the handle relative to the cylinder to maintain spacing between a free end of the handle and an exterior surface of the cylinder.

Portable Fire Suppression Device

Figure 1:
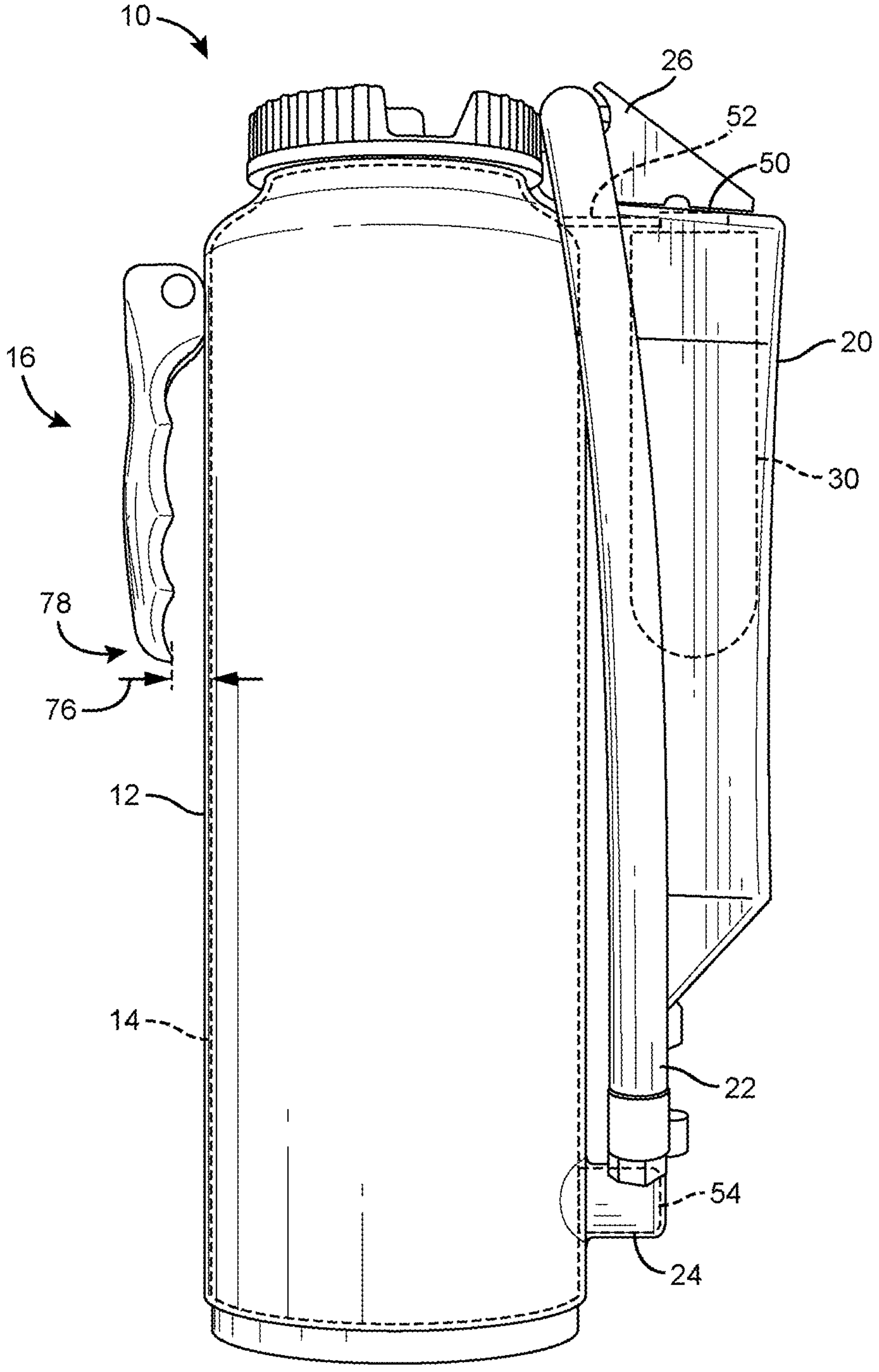
FIG. 1 is a side view of a portable fire suppression device including a handle assembly, according to an exemplary embodiment.
Figure 2:
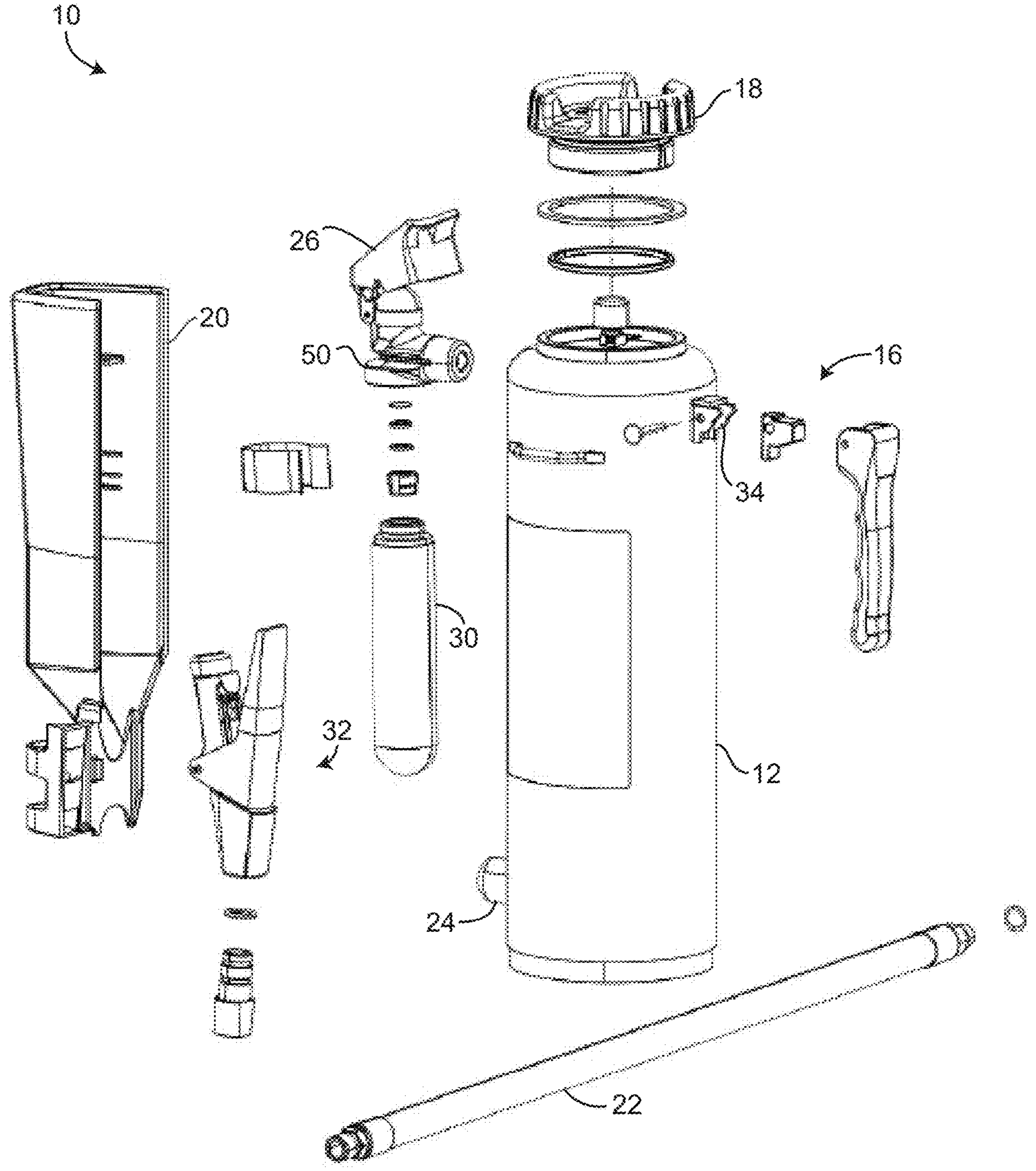
FIG. 2 is an exploded perspective view of the portable fire suppression device of FIG. 1.

Referring to FIGS. 1-2, a portable fire suppression device 10 (e.g., a fire extinguisher, a portable fire suppression apparatus, a fire suppression apparatus, a dispensing apparatus, etc.) is shown, according to an exemplary embodiment. The portable fire suppression device 10 is configured to store and discharge a fire suppressant agent for use in suppressing, extinguishing, controlling, etc., a fire. The portable fire suppression device 10 includes a cylinder 12 (e.g., a canister, a cartridge, a container, a reservoir, a tank, etc.) configured to store the fire suppressant agent. The cylinder 12 includes an inner volume 14, within which the fire suppressant agent is stored until the portable fire suppression device 10 is activated to discharge the fire suppressant agent. The fire suppressant agent may be pressurized within the cylinder 12 and can be stored in the form of a liquid, a gas, a saturated liquid/gas mixture, etc.

The portable fire suppression device 10 also includes a handle assembly 16, a tubular member 22 (e.g., a hose, a conduit, a pipe, a flexible pipe, etc.), a cartridge 30 (e.g., a canister, a tank, an external cartridge, etc.), an activation button 26, and a cover 20. The cylinder 12 is fluidly coupled with an inner volume of the cartridge 30 through a valve 50 and a channel 52. The tubular member 22 is fluidly coupled (e.g., selectively or removably coupled) with the inner volume 14 of the cylinder 12 through a passageway 54 (e.g., an outlet for expelling the fire suppressant agent) formed through a protrusion 24 of the cylinder 12 at a bottom end of the cylinder 12. The cartridge 30 can include an inner volume, within which a compressed or propellant gas is stored. The cylinder 12 can also include a cap 18 that is configured to seal the inner volume 14 of the cylinder 12. The cap 18 may be removable to recharge or re-fill the inner volume 14 of the cylinder 12 with new fire suppressant agent.

The cartridge 30 is configured to selectively fluidly couple with the inner volume 14 of the cylinder 12 through the channel 52 when the valve 50 is transitioned from a closed position to an open position. The valve 50 can be transitioned between the closed position and the open position by operation of the activation button 26. For example, pressing the activation button 26 may transition the valve 50 from the closed position to the open position, thereby fluidly coupling the cartridge 30 with the inner volume 14 of the cylinder 12. Once the cartridge 30 is fluidly coupled with the inner volume 14 of the cylinder 12, the propellant gas may expand, and flow from the cartridge 30 to the inner volume 14 of the cylinder 12, through the valve 50 and the channel 52.

The propellant gas pressurizes the fire suppressant agent within the inner volume 14 of the cylinder 12 so that the fire suppressant agent is biased into, or through, the passageway 54 and the tubular member 22. The tubular member 22 can be coupled with a valve handle 32 (shown in FIG. 2). The valve handle 32 may include a valve operable by a user between an open position and a closed position. When the propellant gas pressurizes the fire suppressant agent in the inner volume 14 of the cylinder 12, and the valve handle 32 is transitioned into the open position, the fire suppressant agent may be driven to exit the inner volume 14 of the cylinder 12, flow through the passageway 54, through the tubular member 22, and exit the tubular member 22 through the valve handle 32 (e.g., through an outlet aperture, a nozzle of the valve handle 32, etc.).

The user can grasp and hold the portable fire suppression device 10 at the handle assembly 16. The handle assembly 16 can facilitate proper angulation of the cylinder 12. The user may grasp the handle assembly 16, press the activation button 26, and direct the tubular member 22 and the valve handle 32 towards different areas to dispense or discharge the fire suppressant agent, while operating the valve handle 32. The handle assembly 16 facilitates portability of the portable fire suppression device 10.

When the portable fire suppression device 10 is implemented in a heavy equipment application, vibrations may occur. When the portable fire suppression device 10 is installed (e.g., in a bracket) on a piece of mobile equipment, vibrations may be directed between the handle assembly 16 and the cylinder 12 (e.g., from operation of the engine and movement of a piece of mining equipment). If not controlled or damped, such vibrations can cause undesirable effects such as difficulty in operating, damage to the handle assembly 16, chipping of paint on an exterior surface of the cylinder 12, etc. Chipped paint on a fire suppression device may be a potential failure point due to possibly allowing the tank to corrode. At many industrial or commercial job sites, chipped paint on a tank may require decommissioning and replacement of the tank, or replacement of an entire fire suppression device.

Handle Assembly with Bumper

Overview

Figure 3:
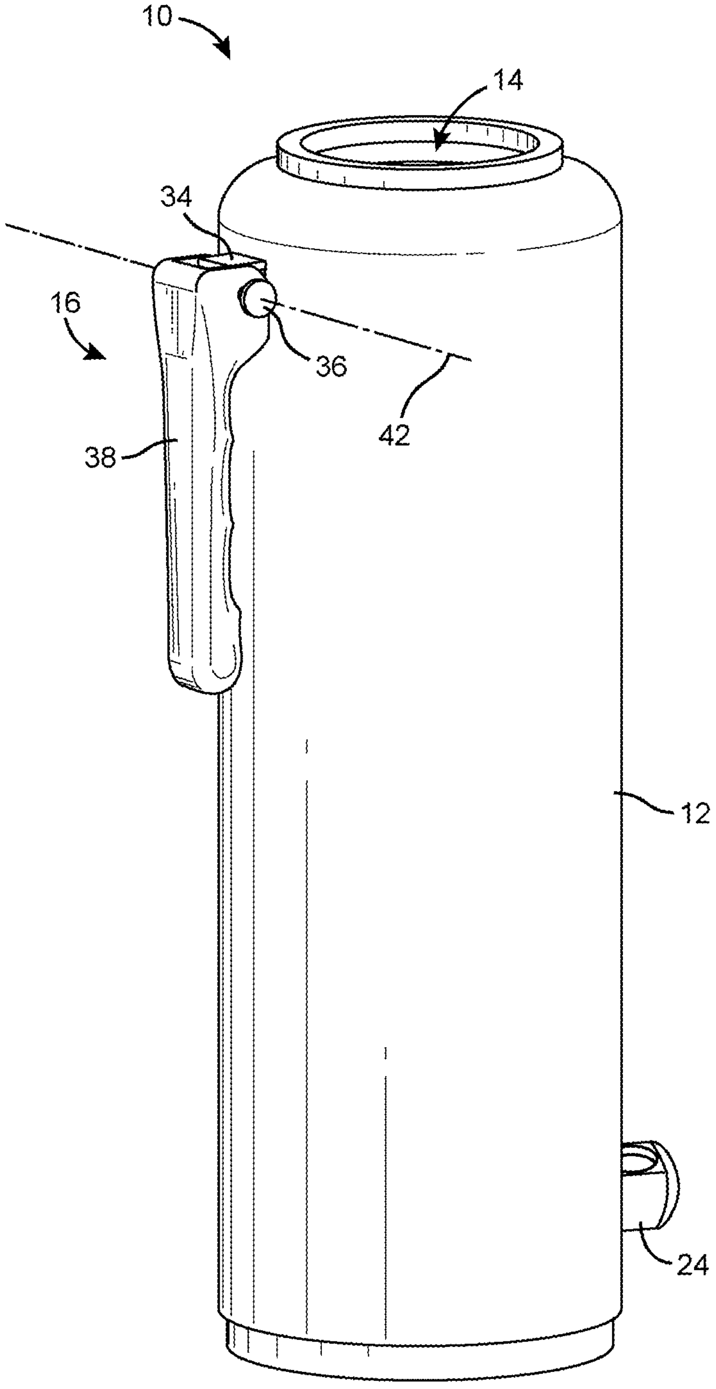
FIG. 3 is a view of a first handle assembly of the portable fire suppression device of FIG. 1.
Figure 4:
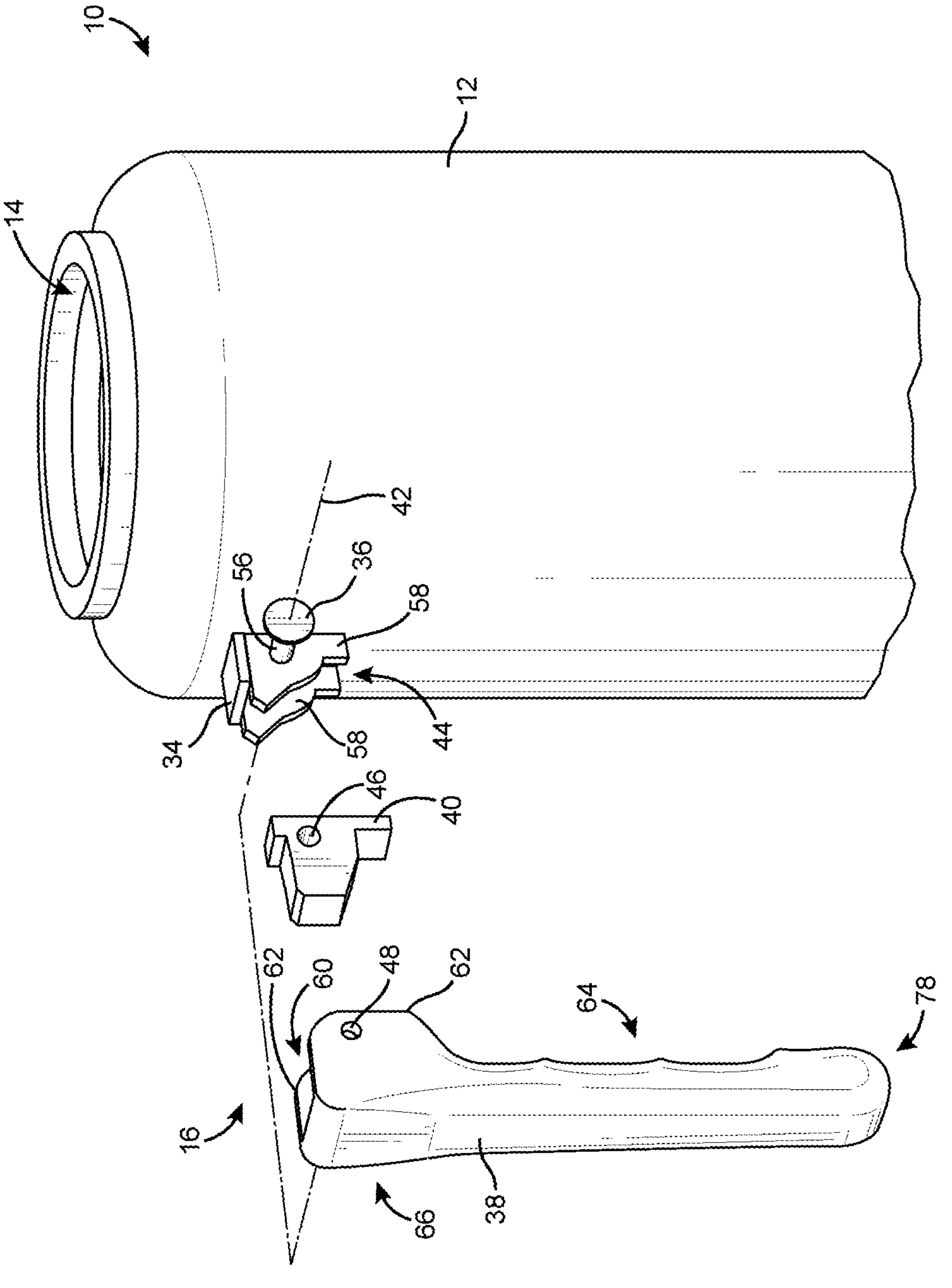
FIG. 4 is an exploded perspective view of the first handle assembly of FIG. 3.

Referring particularly to FIGS. 3-4, the handle assembly 16 is shown in greater detail, according to an exemplary embodiment. The handle assembly 16 includes a handle 38, a pin 36, and a resilient bumper 40 (e.g., a rubber bumper, a damper, a metal spring, or bumper made of other resilient material). The handle 38 couples with a receiving portion, a hinge portion, a corresponding member, a clevis, a portion of the cylinder 12, etc., shown as lug 34. The lug 34 includes a bore 56 extending therethrough, through which the pin 36 extends. The lug 34 includes a pair of wall members 58 that are spaced apart and define a receiving opening 44 therebetween. The bumper 40 also includes a bore 46 and is positioned between the wall members 58 of the lug 34, within the receiving opening 44 of the lug 34. The bumper 40 can be positioned within the receiving opening 44 of the lug 34 so that the bumper 40 abuts, directly contacts, etc., an exterior surface of the cylinder 12 that is between the wall members 58 of the cylinder 12. In some embodiments, a gap is formed between the bumper 40 and the exterior surface of the cylinder 12 that is between the wall members 58.

The handle 38 can include a grasping portion 64 defining a first end of the handle 38 and a connection portion 66 at an opposite end of the handle 38. The grasping portion 64 can include one or more indents or finger portions to facilitate an ergonomic grip of the handle 38. The connection portion 66 can include a pair of opposite wall members 62 that are positioned a distance apart, and define a gap 60 therebetween. The gap 60 can be sized so that the lug 34 is received within the gap 60, between the wall members 62. The wall members 62 define a bore 48 (e.g., an opening, an aperture, etc.). When the handle assembly 16 is assembled, the bore 48 of the handle 38 is aligned with the bore 46 of the bumper 40, which are both aligned with the pin 36. The pin 36 can extend through the bore 56 of the lug 34, the bore 46 of the bumper 40, and the bore 48 of the handle 38. The pin 36 can define an axis 42 about which the handle 38 may rotate relative to the cylinder 12. The bumper 40 is configured to absorb vibration that occurs when the portable fire suppression device 10 when attached implemented in heavy duty or mobile equipment and the equipment is in operation (e.g., engine running) or moving. The bumper 40 may be made from rubber and can function as a damper to reduce an amount of vibration transferred from the cylinder 12 to the handle 38.

Figure 5:
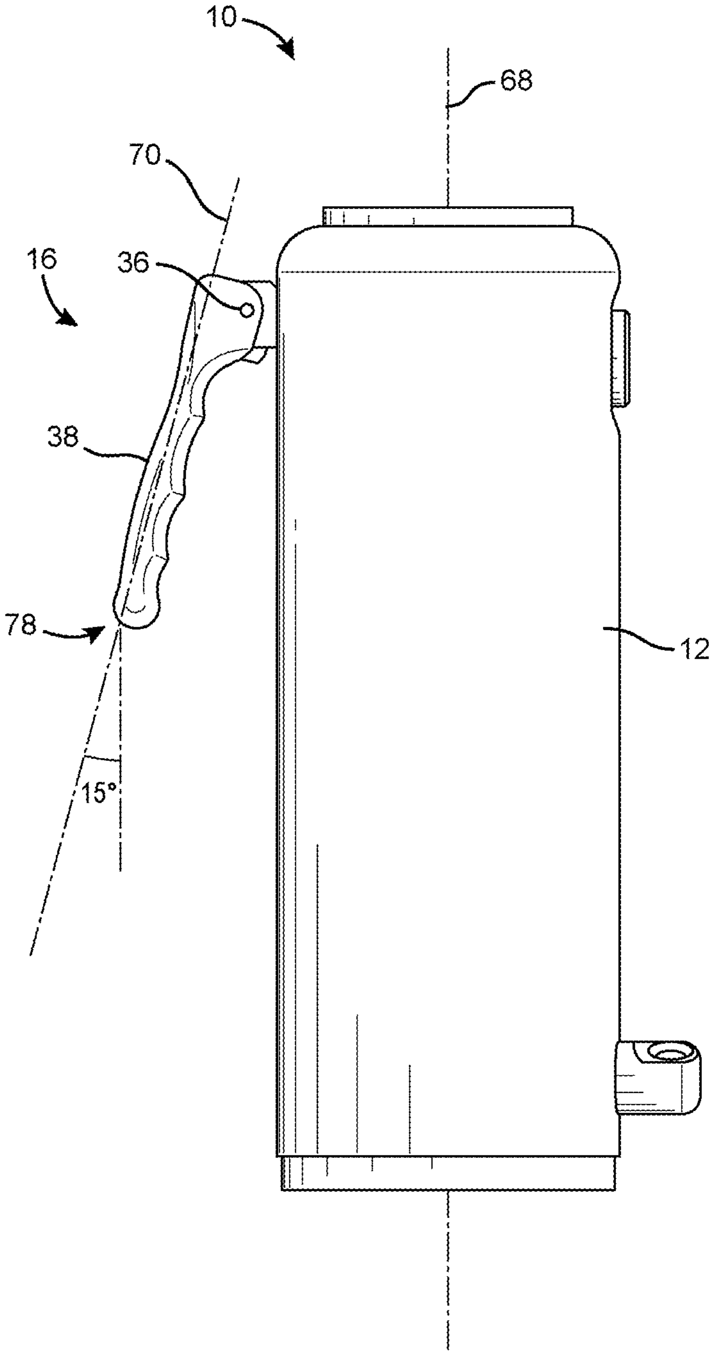
FIG. 5 is a side view of the portable fire suppression device of FIG. 1 showing the handle assembly rotated relative to the cylinder.
Figure 8:
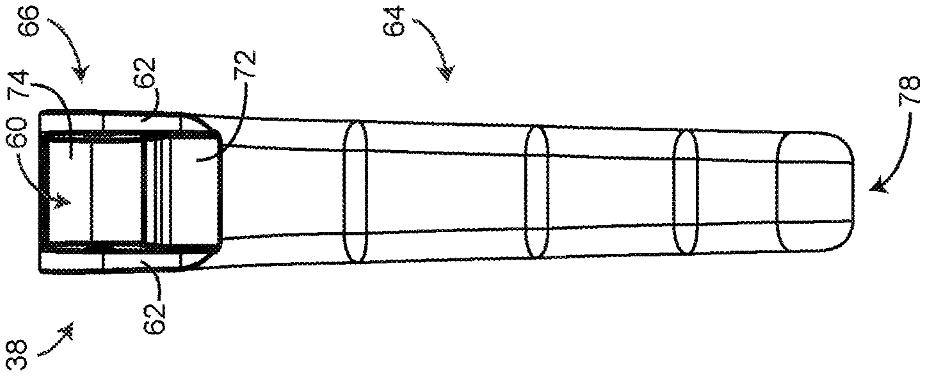
FIG. 8 is a front view of the handle of FIG. 6.

Referring particularly to FIG. 5, the handle 38 of the handle assembly 16 can be configured to rotate or pivot about the pin 36 to form an angle between an axis 70 extending through the handle 38, and a longitudinal axis 68 of the cylinder 12. The angle may be 15 degrees. In other embodiments, the angle is 45 degrees. The angle can facilitate proper orientation of the cylinder 12 when the fire suppressant agent is discharged from the cylinder 12.

Handle

Figure 7:
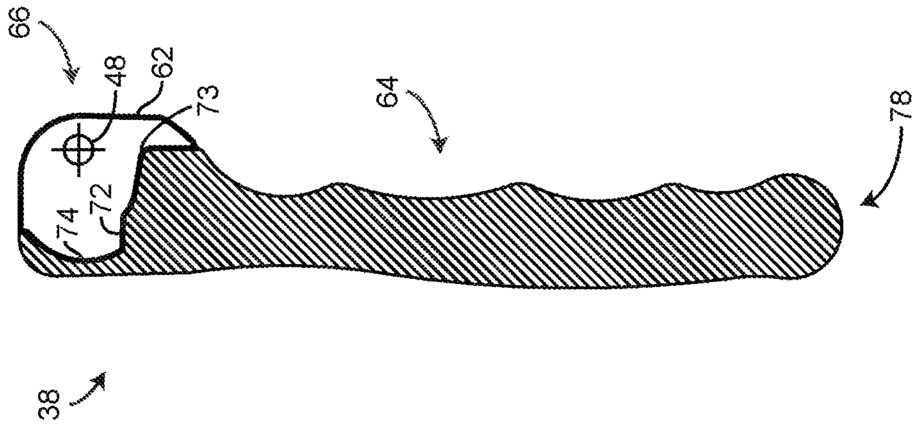
FIG. 7 is a side sectional view of the handle of FIG. 6 along line 7-7.
Figure 6:
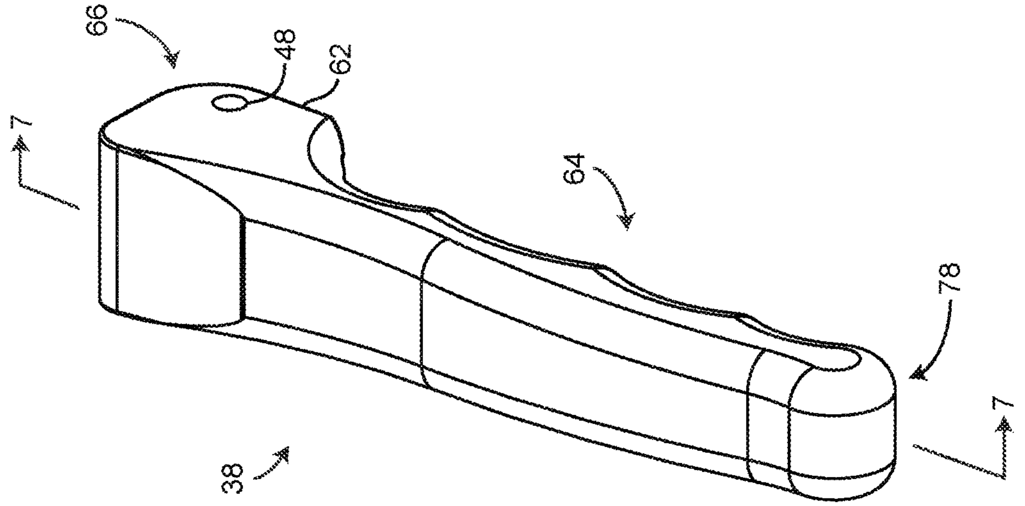
FIG. 6 is a perspective view of a handle of the first handle assembly of the portable fire suppression device of FIG. 3.

Referring particularly to FIGS. 1, 3-4, and 6-8, the handle 38 is shown in greater detail, according to an exemplary embodiment. The handle 38 includes the grasping portion 64 (e.g., a handle portion, a hand grip portion, etc.) for grasping by a user's hand and the connection portion 66. The handle 38 also includes a free end 78 (e.g., a distal end) that is opposite the connection portion 66. The connection portion 66 includes the wall members 62 that define the gap 60 therebetween. The wall members 62 each include the bore 48 through which the pin 36 extends when the handle assembly 16 is assembled with the cylinder 12 (e.g., shown in FIGS. 3-5). As shown in FIG. 7, the connection portion 66 of the handle 38 defines a first surface 72 and a second surface 74 between the wall members 62. The wall members 62 are spaced apart to form the gap 60 such that the lug 34 can be received within the gap 60. The second surface 74 can be a curved rear surface that facilitates rotation of the handle 38. The first surface 72 can include one or more steps, shoulders, or stepped portions (e.g., shoulder 73) that are configured to engage or correspond to a neighboring surface of the bumper 40. In some embodiments, the first surface 72 is configured to engage, abut, contact, etc., a corresponding surface or portion of the bumper 40 when the handle 38 is rotated relative to the bumper 40.

Bumper

Figure 10:
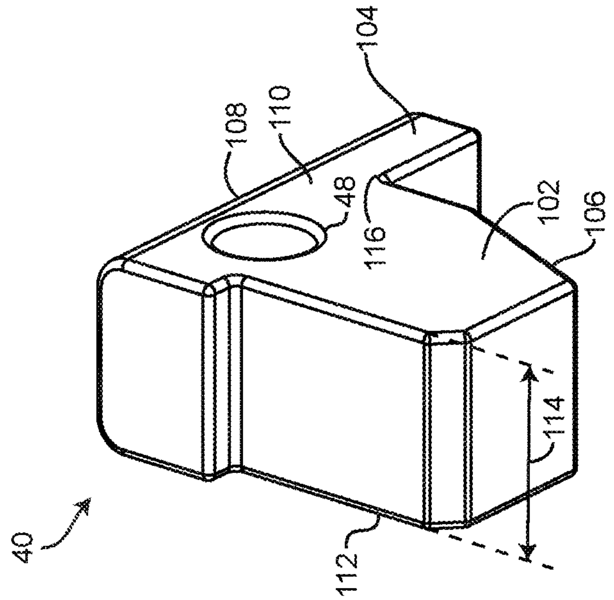
FIG. 10 is a perspective view of the rubber bumper of FIG. 9.
Figure 9:
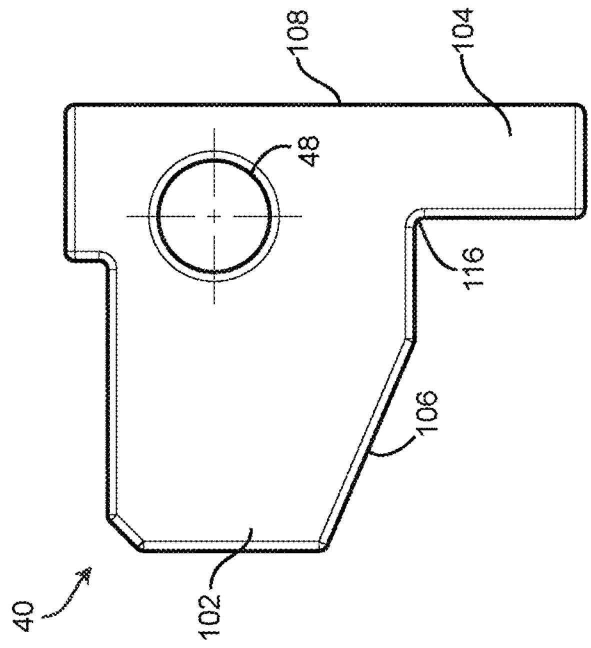
FIG. 9 is a side view of a rubber bumper of the first handle assembly of FIG. 3.

Referring particularly to FIGS. 9-10, the bumper 40 is shown in greater detail, according to an exemplary embodiment. The bumper 40 can be manufactured from a rubber, resilient, or elastomeric material (e.g., an elastomeric rubber having a hardness of 40+/−5, Shore D). The bumper 40 includes a main portion 102 having an angled surface 106, and a protrusion 104. The protrusion 104 and the main portion 102 can define a shoulder 116. The shoulder 116 can correspond to the shoulder 73 of the handle 38 so that when the bumper 40 is installed in the handle 38 (e.g., positioned in the gap 60 between the wall members 62), the shoulder 116 of the bumper 40 is positioned at the shoulder 73 of the handle 38.

The bumper 40 can have a thickness 114 that is less than or substantially equal to (or slightly greater than) a distance of the opening 44 of the lug 34 (e.g., a distance between inwardly facing surfaces of the wall members 58). In this way, the bumper 40 can be positioned within the lug 34, with the connection portion 66 extending on opposite sides of the wall members 58. The protrusion 104 may overhang the shoulder 73 of the first surface 72. In some embodiments, the main portion 102 defines a cylinder facing end (e.g., an end of the bumper 40 proximate the cylinder 12 where the surface 108 is located) and an opposite end (e.g., a rear end of the bumper 40 on an opposite side of the cylinder facing end).

The bumper 40 defines a surface 108 (e.g., a face) that is configured to abut, engage, contact, etc., an exterior surface of the cylinder 12 or be spaced apart a distance from the exterior surface of the cylinder 12 between the wall members 58 of the lug 34. The surface 108 can be a flat or planar surface that is defined by the main portion 102 and the protrusion 104. The angled surface 106 may correspond to or extend over the first surface 72 of the handle 38. When the handle 38 is rotated relative to the bumper 40, the first surface 72 may engage, directly contact, abut, etc., the angled surface 106 of the bumper 40, thereby limiting further rotation between the handle 38 and the cylinder 12. The bore 48 extends through substantially an entire thickness of the bumper 40. Advantageously, when the bumper 40 is installed in the handle assembly 16, the bumper can limit axial movement of the handle 38 along the axis 42 relative to the cylinder 12. The bumper 40 may absorb vibrations, shock, etc., that is transferred through the cylinder 12 to the handle 38 when the portable fire suppression device 10 is implemented in an environment where vibrations can occur (e.g., mounted on heavy duty or mobile equipment). The bumper 40 can have a tight fit with the lug 34 so that the wall members 58 exert a compressive force on opposite side surfaces 110 and 112 of the bumper 40.

Referring to FIGS. 1 and 4, the bumper 40 can facilitate limiting movement of the free end 78 of the handle 38 towards the exterior surface of the cylinder 12. For example, when the handle 38 is in a first angular position (shown in FIG. 1), a gap 76 can be formed between the free end 78 of the handle and the exterior surface of the cylinder 12. The bumper 40 absorbs vibrations so that less vibration is transferred from the cylinder 12 to the handle 38, thereby limiting movement of the free end 78 of the handle 38 towards the exterior surface of the cylinder 12. The bumper 40 can facilitate maintaining at least the gap 76 between the free end 78 of the handle 38 and the exterior surface of the cylinder 12, thereby reducing a likelihood that the free end 78 of the handle contacts, hits, touches, engages, etc., the exterior surface of the cylinder 12, and thereby reducing a likelihood of paint chipping on the exterior surface of the cylinder 12 due to contact between the exterior surface of the cylinder 12 and the free end 78 of the handle 38.

Alternative Handle Assembly

Figure 12:
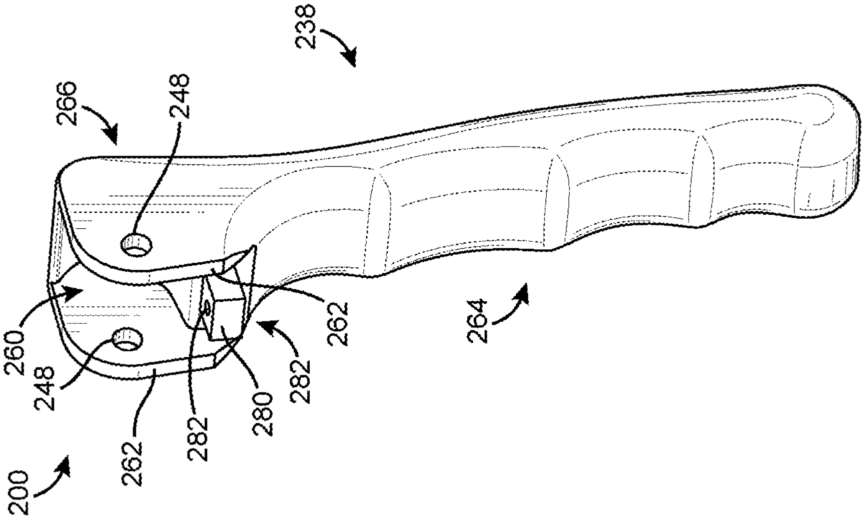
FIG. 12 is a perspective view of a handle of the handle assembly of FIG. 11.
Figure 11:
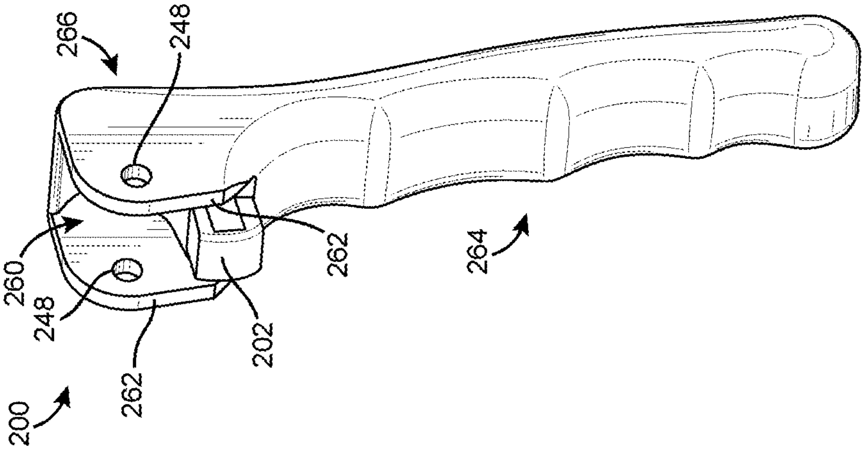
FIG. 11 is a perspective view of another handle assembly for use with the portable fire suppression device of FIG. 1, according to an exemplary embodiment.

Referring now to FIGS. 11-14, an alternative handle assembly 200 is shown, according to another embodiment. The alternative handle assembly 200 includes a handle 238 (shown in FIG. 11), and an alternative bumper 202 (shown in FIGS. 13-14). FIG. 12 shows the alternative handle assembly 200 assembled, with the alternative bumper 202 installed on the handle 238. The handle assembly 200 can be assembled on the cylinder 12 similar to the handle assembly 16. For example, the handle assembly 200 may also include the pin 36 to couple the handle assembly 200 with the lug 34 of the cylinder 12. The handle 238 includes a grasping portion 264 and a connection portion 266 that define opposite ends of the handle 238. The connection portion 266 is configured to couple with the lug 34 of the cylinder 12 to couple the handle 238 with the cylinder 12.

The bumper 202 may couple with a protrusion 280 of the handle 238. The protrusion 280 can extend from a bottom part of the connection portion 266 of the handle 238. The protrusion 280 includes a pair of openings 282 on opposite sides (e.g., opposite vertical sides) to facilitate coupling the bumper 202 with the protrusion 280 of the handle 238. The connection portion 266 also includes a pair of wall members 262 that define a gap 260 therebetween. The gap 260 can be sized such that the lug 34 is received within the gap 260. The wall members 262 include bores 248, through which the pin 36 extends when the handle assembly 200 is assembled with the cylinder 12.

Figure 13:
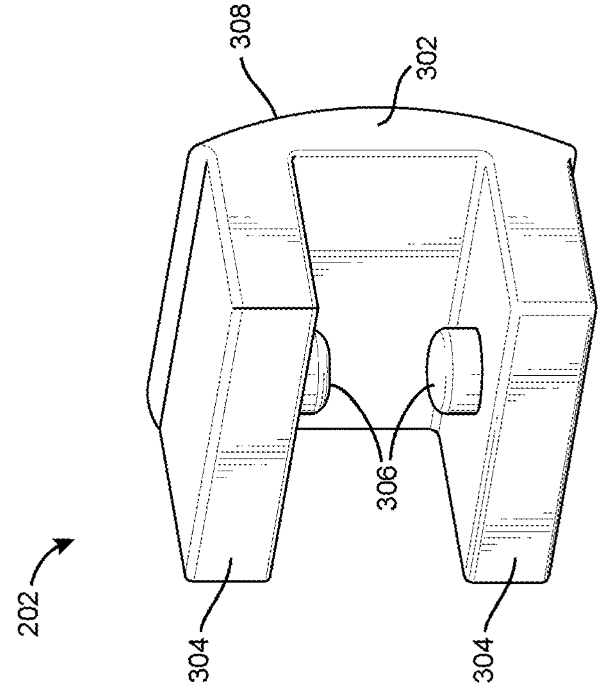
FIG. 13 is a perspective view of a rubber bumper of the handle assembly of FIG. 11.

Referring particularly to FIG. 13, the bumper 202 can be manufactured as an integrally formed rubber component having a pair of walls 304 spaced apart, and conjoined with a wall 302 (e.g., a main wall, a central portion, etc.) at one end of the walls 304. The wall 302 may define a exterior surface 308 which is configured to contact, abut, engage, etc., an exterior surface of the cylinder 12 when the alternative handle assembly 200 is assembled with the cylinder 12. The walls 304 each include a protrusion 306 that extend inwards towards each other. The protrusions 306 can be received within the openings 282 of the protrusion 280 of the handle 238 when the bumper 202 is installed on the protrusion 280 of the connection portion 266 of the handle 238. The bumper 202 can have an overall U-shape, with protrusions 306 for coupling the bumper 202 with the protrusion 280 of the handle 238.

Figure 14:
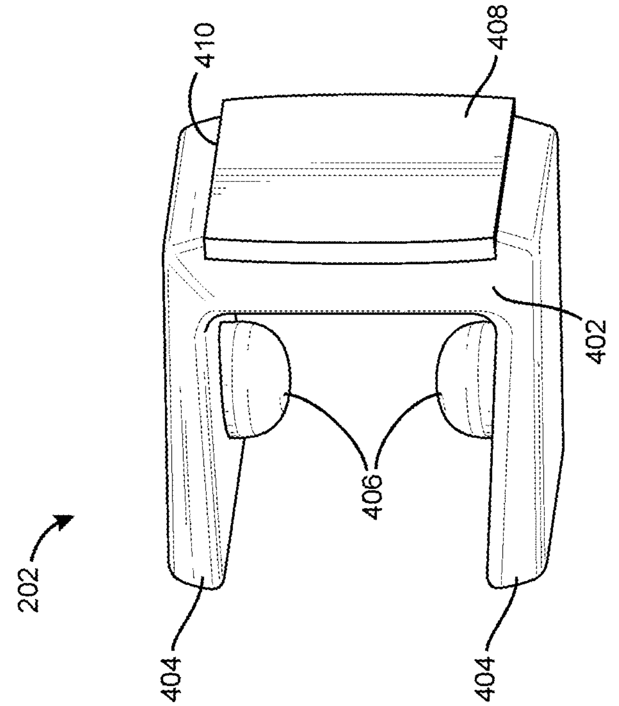
FIG. 14 is another perspective view of a rubber bumper of the handle assembly of FIG. 11.

Referring particularly to FIG. 14, the bumper 202 can be manufactured as a plastic insert (e.g., hard plastic) with a molded rubber member 410. The bumper 202 includes walls 404 (e.g., the same as or similar to the walls 304), a wall 402 (e.g., the same as or similar to the wall 302), and a pair of protrusions 406 (e.g., the same as or similar to the protrusions 306) that extend inwards towards each other. The walls 404, the wall 402, and the protrusions 406 can be integrally formed and manufactured from a hard plastic material. The molded rubber member 410 is attached or adhered with an exterior surface of the wall 402 and defines an exterior surface 408 (e.g., the same as or similar to the exterior surface 308).

Handle Assembly with Spring

Figure 15:
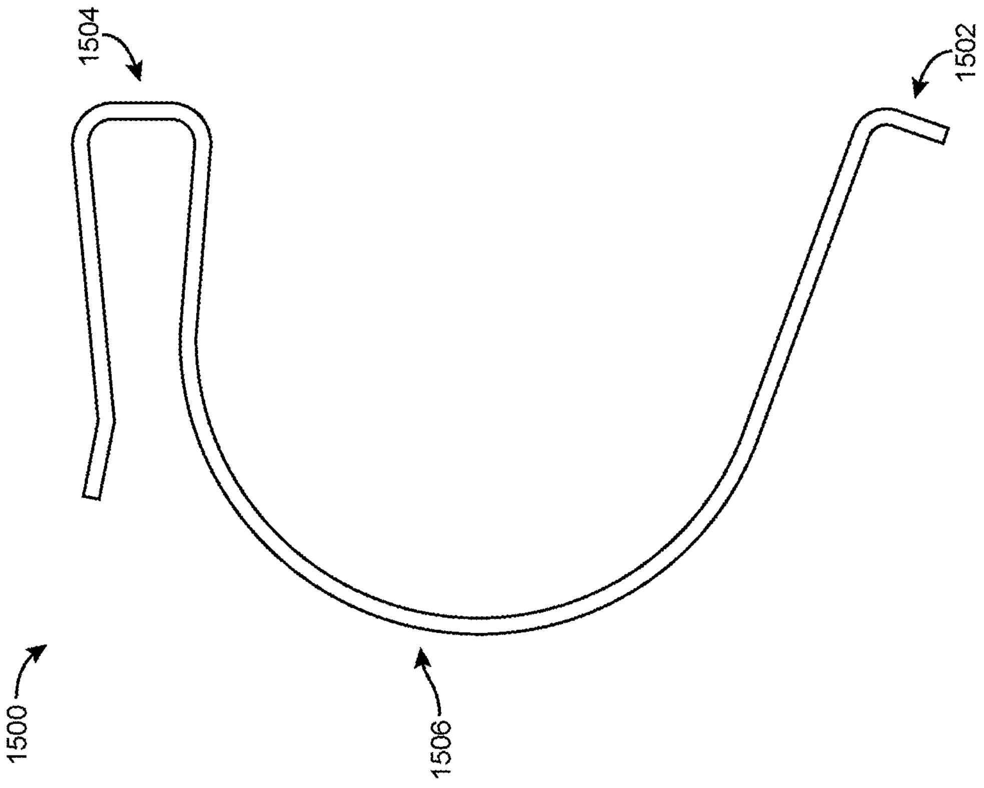
FIG. 15 is a perspective view of another handle assembly, according to an exemplary embodiment.

Referring now to FIG. 15, the bumper 40 may be implemented as a spring 1500. The spring 1500 can be positioned within the connection portion 66 of the handle 38. The spring 1500 includes a first end 1502, a second end 1504, and a medial portion 1506. The medial portion 1506 can have a generally arcuate shape extending between the first end 1502 and the second end 1504. The first end 1502 and the second end 1504 can be configured to engage corresponding portions of the lug 34 and/or the first surface 72 or the second surface 74 of the connection portion 66 of the handle 38.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system and the nozzle as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the spring 1500 of the exemplary embodiment described with reference to FIG. 15 may be incorporated in the handle assembly 16 of the exemplary embodiment described with reference to FIGS. 3-4. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A portable fire suppression device comprising:

a cylinder configured to store and discharge a quantity of fire suppressant agent in an inner volume, the cylinder comprising an outlet for expelling the fire suppressant agent from the cylinder, the cylinder including a bottom wall and a sidewall extending from the bottom wall, the bottom wall and the sidewall at least partially defining the inner volume; and a handle assembly comprising:

- a handle comprising a grasping portion for grasping with a user's hand and a connection portion, the connection portion defining a gap configured to receive and attach to a lug of the cylinder, the lug positioned on the sidewall, the handle including a free end located opposite the connection portion; and
- a resilient bumper positioned within an opening of the lug, the resilient bumper contacted by (i) a surface of the connection portion of the handle that faces the sidewall and (ii) at least one of the lug of the cylinder or the sidewall, the resilient bumper configured to absorb vibration and limit movement of the free end relative to the cylinder.

2. The portable fire suppression device of claim 1, further comprising a pin configured to pivotally attach the handle to the lug of the cylinder, the handle configured to pivot relative to the resilient bumper and the cylinder a limited angular amount.

3. The portable fire suppression device of claim 2, wherein the limited angular amount is 15 degrees.

4. The portable fire suppression device of claim 2, wherein the pin extends through a plurality of openings of the lug, a bore of the resilient bumper, and a plurality of openings of the connection portion of the handle.

5. The portable fire suppression device of claim 1, further comprising:

an external cartridge coupled with the cylinder, the external cartridge configured to store a pressurized gas and fluidly couple with the inner volume of the cylinder to discharge the fire suppressant agent from the cylinder.

6. The portable fire suppression device of claim 1, wherein the resilient bumper is a rubber bumper.

7. The portable fire suppression device of claim 6, wherein the rubber bumper comprises:

a main portion defining a cylinder facing end and an opposite end;

a protrusion extending downwards from the main portion at the cylinder facing end; and an opening extending through the main portion, the opening configured to receive a pin configured to pivotally attach the handle to the lug of the cylinder, the handle configured to pivot relative to the resilient bumper and the cylinder a limited angular amount;

wherein the main portion and the protrusion cooperatively define a surface at the cylinder facing end, the surface configured to abut the cylinder.

8. The portable fire suppression device of claim 7, wherein the connection portion of the handle comprises a curved rear surface within the gap, the opposite end proximate the curved rear surface, wherein a portion of the curved rear surface is configured to abut the opposite end at a particular angular position of the handle relative to the cylinder.

9. The portable fire suppression device of claim 7, wherein the rubber bumper is received within the lug and the lug is received within the gap of the connection portion of the handle.

10. The portable fire suppression device of claim 1, wherein the portable fire suppression device further includes a lid configured to couple with the cylinder at an end of the cylinder opposite the bottom wall, the lug configured to remain on the sidewall when the lid is removed from the cylinder.

* * * * *